United States Patent Office 3,339,778
Patented Sept. 5, 1967

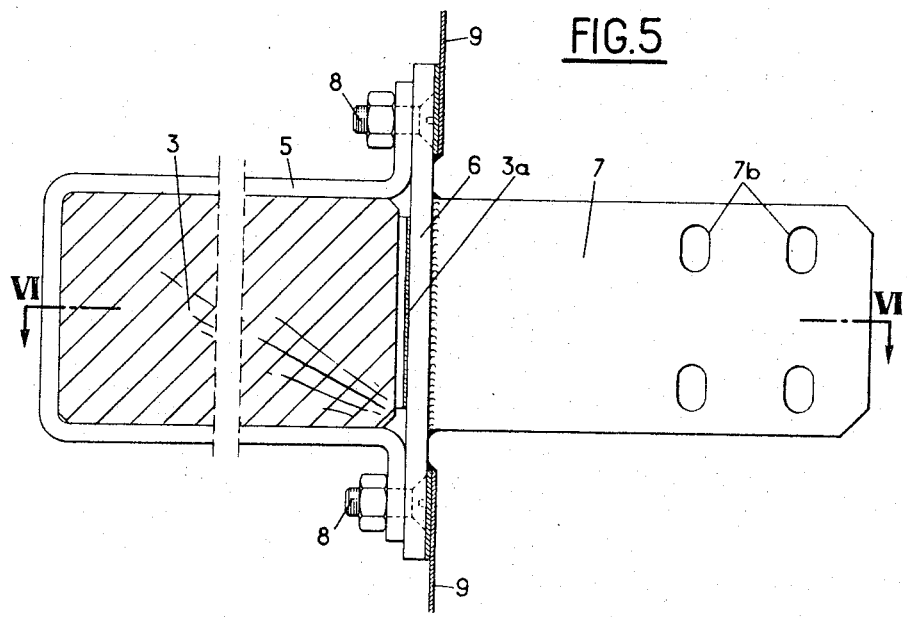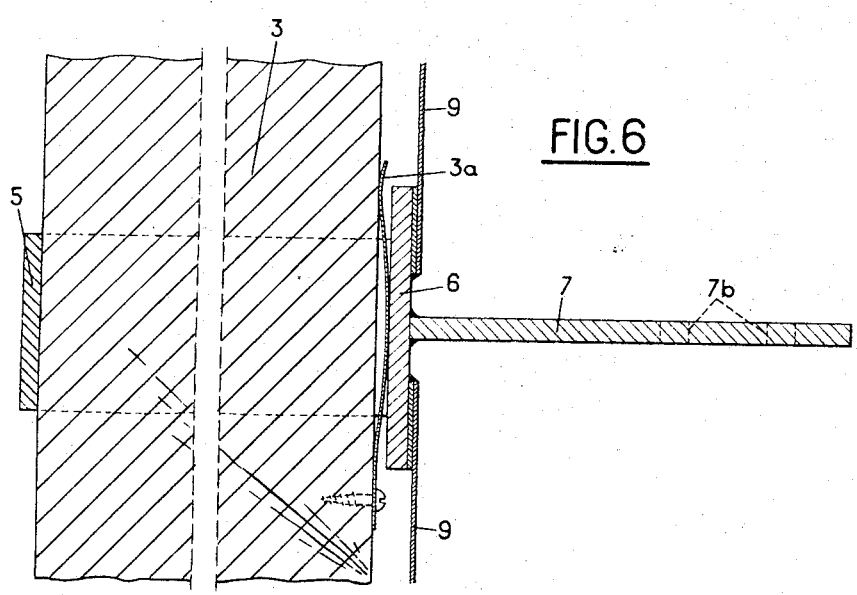

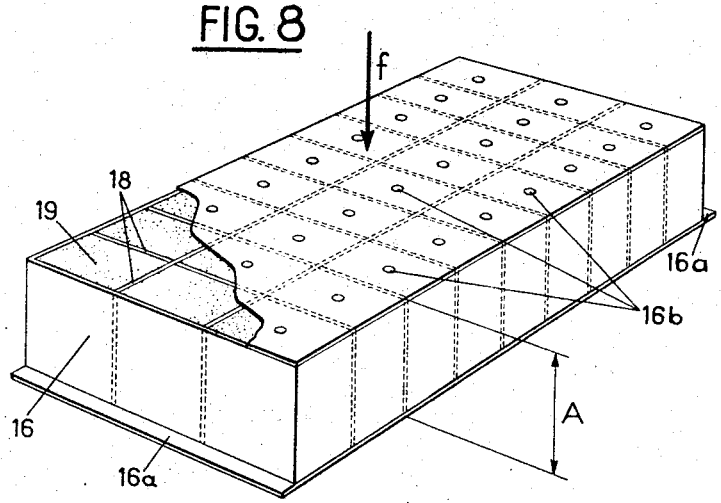
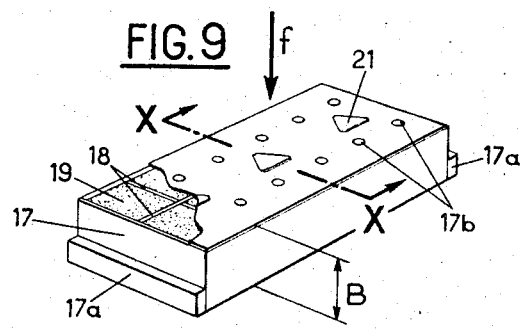
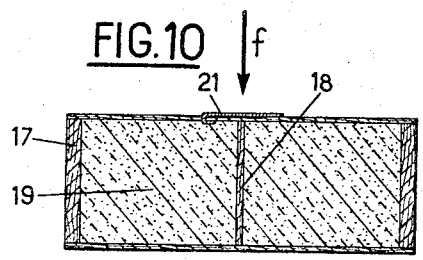

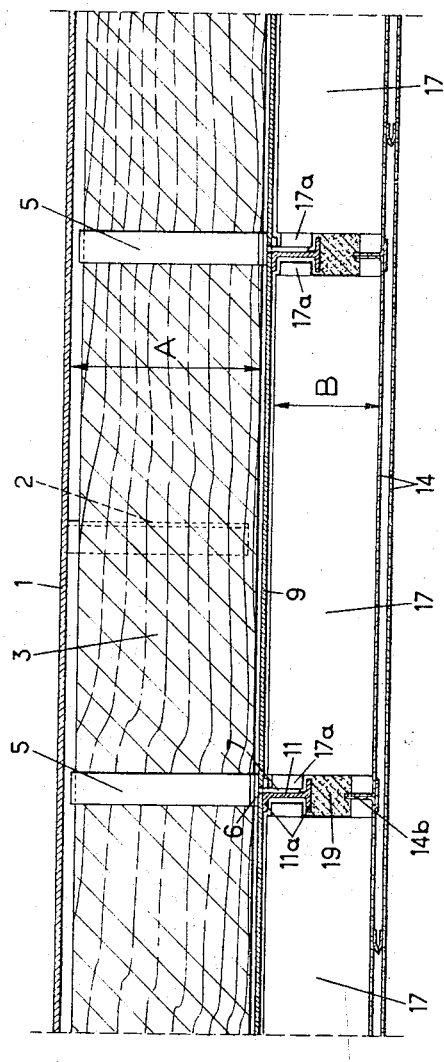

3,339,778
INSULATED TANK FOR LIQUIDS AT LOW TEMPERATURES
Pierre Herrenschmidt, Neuilly-sur-Seine, Seine, France, assignor to Societe Anonyme des Ateliers et Chantiers de la Seine Maritime, Paris, France, a corporation of France
Filed Apr. 20, 1964, Ser. No. 361,044
Claims priority, application France, Apr. 24, 1963, 932,573, Patent 1,363,994; Oct. 25, 1963, 951,876, Patent 84,587
7 Claims. (Cl. 220—9)

Ships for transporting liquefied natural gas often carry self-supporting tanks distinct from the structure of the ship. Such tanks have the disadvantage from an economic point of view that they do not always make maximum use of the available space in the ship.

Ships have also been proposed which comprise integrated non-self-supporting tanks formed with fluid-tight corrugated walls which are elastically deformable. In these tanks the contractions due to the temperature of the product being transported are absorbed by yielding of the said fluid tight walls. In practice, such tanks are difficult to construct, since the welds between the deformable plates of which they are made must necessarily follow the undulations thereof.

The object of the present invention is to provide a new article of manufacture which consists of a tank made in such a way as to reduce these difficulties.

Such a tank, which is designed to hold not only liquefied natural gas, but any other fluid which is liquid at low temperatures, is essentially characterized by the fact that it comprises a framework which is free to contract and expand, fixed to the inner surface of an outer shell. A fluid-tight inner shell is mounted on the framework so that it is also free to contract and expand. This inner shell is formed of thin flexible plates, welded to each other, preferably made of a material having a low coefficient of expansion, said inner and outer shells being separated by suitable supporting insulation.

In a preferred embodiment of the invention the outer shell consists of the hull of the ship itself and between this hull and the inner shell, and between two insulating layers, is a supplemental envelope or secondary barrier consisting of thin flexible plates made of the same material as that of the inner and outer shells, or of a different material, and mounted, like said shells, in such a way that it may freely expand and contract.

This embodiment may also have the following characteristics, either singly or in combination:

(a) Two suitably spaced ribs are mounted on the inner surface of the outer shell of the tank, for example the hull of a ship. Vertical uprights are fixed to these ribs, and in turn carry the small girders constituting the framework for the plates of the inner shell.

(b) The ribs fixed to the inner surface of the outer shell of the tank are provided with straps carrying a tab which extends through a fluid-tight seat in the secondary barrier of the tank. Elastic means positioned between the rib and strap draws the framework and inner shell together while permitting the shell to follow the elastic yielding of the insulation support in response to pressure or to the contraction of the insulation.

(c) The girders constituting the framework of the inner shell of the tank are freely engaged in the straps fixed to the aforesaid uprights.

(d) The plates forming the inner shell of the tank have flanges attached to the inner surface of the small girders.

(e) The insulation supports which separate the inner and outer shells from the intermediate shells are made of insulation containers, preferably unequal in thickness, which comprise a compartmented body, made preferably of laminated material, each compartment being filled with pulverulent expanded perlite or any other material having similar properties, this material being enclosed by walls of the containers themselves and their partitions. The casings may be partitioned by a network of cellular elements such as those described in French Patent No. 1,124,955 filed Mar. 8, 1954. It should be noted that these elements are selected by applicant because of their excellent heat insulating qualities. Moreover, when these elements are filled they have a very substantial resistance to crushing, especially in a longitudinal direction, a characteristic which is essential in the case of insulation supports.

(f) Since the shells of the tank are made of a material having a very low coefficient of expansion, in order to save expense it is necessary to make these shells of very thin material. The plates forming the inner shell of the tank are therefore fixed to the insulation support by spot welds so as to impart to the structure good resistance to compression, and these plates are electrically welded to each other along their flanges, the resulting joints being rendered fluid-tight by fusion of the metal.

(g) Passageways are formed between the vertical walls of the containers positioned between the uprights of the shell framework, and are totally or partially filled with expanded perlite or any other suitable insulating material. This arrangement avoids and undesirable continuity in the insulation and permits the evacuation of any gas which may accumulate as the consequence of leakage of the liquid through the inner shell.

(h) The inner shell of the tank consists of a complex multiple wall such, for example, as that described in French application SN 933,980 filed May 7, 1963, entitled, "Tank for Liquefied Natural Gas and Other Products at Low Temperatures."

In order that the invention may be better understood, two embodiments thereof will now be described, purely by way of example, and with reference to the accompanying drawings, in which:

FIG. 5 is a sectional view on an enlarged scale taken along the line V—V of FIG. 1;

FIG. 6 is a sectional view taken along the line VI—VI of FIG. 5;

FIG. 8 is a perspective view showing, partly broken away, one of the containers positioned between the shell of the ship and the intermediate shell forming a secondary barrier in the second embodiment of the invention;

FIG. 9 is a perspective view similar to FIGURE 8, showing one of the containers positioned between the secondary barrier and the inner shell;

FIG. 10 is a sectional view taken along the line X—X of FIG. 9;

FIG. 15 is a partial horizontal sectional view showing another embodiment of the inner shell.

Figure 1:
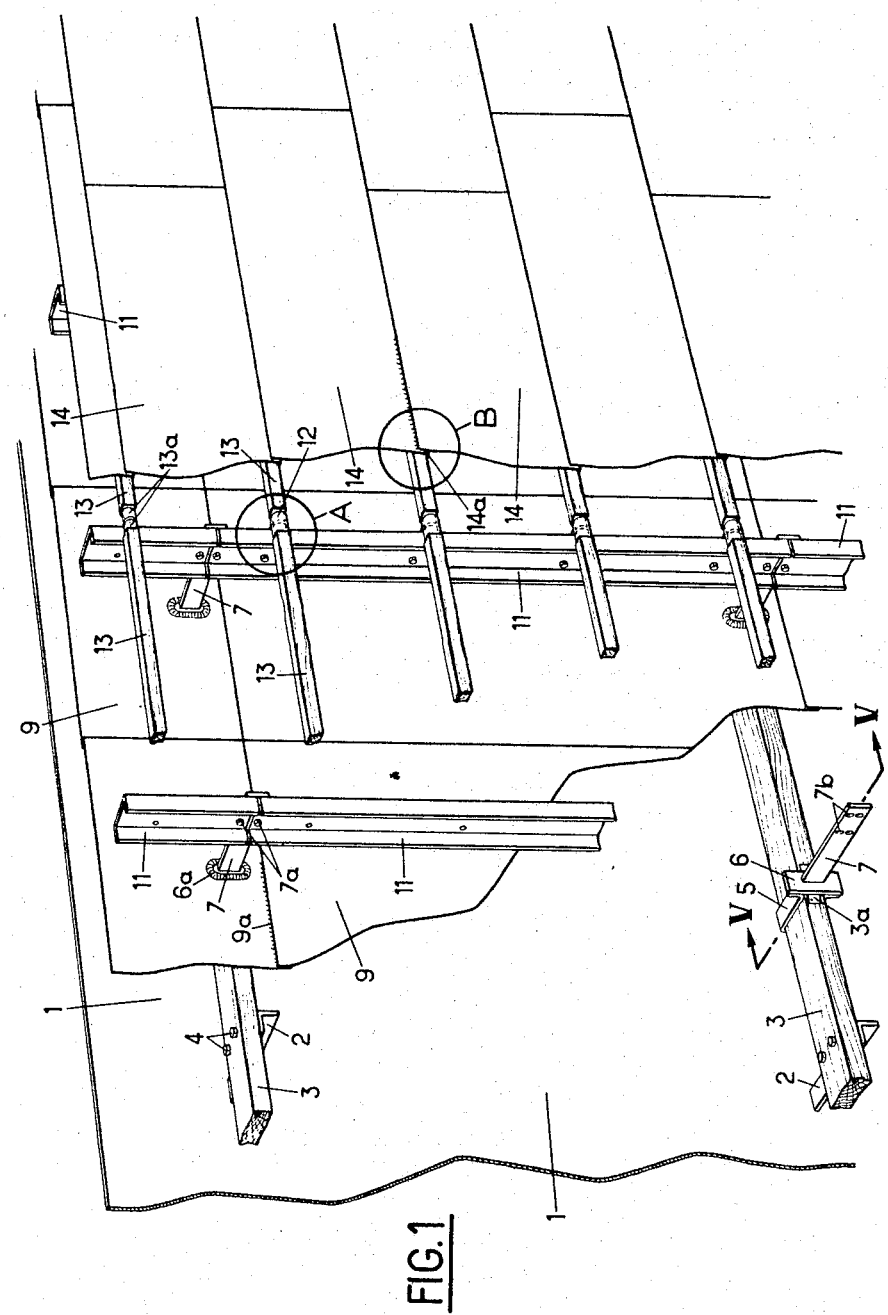
FIG. 1 is a partial perspective view, showing the tank wall, according to one embodiment of the invention.
Figure 2:
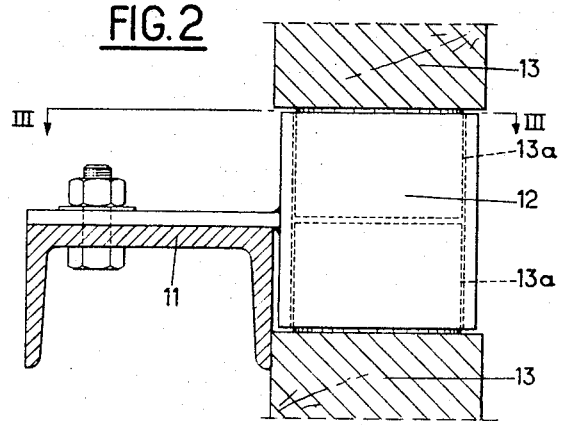
FIG. 2 is a horizontal sectional view showing on an enlarged scale the portion "A" encircled on FIG. 1.
Figure 3:
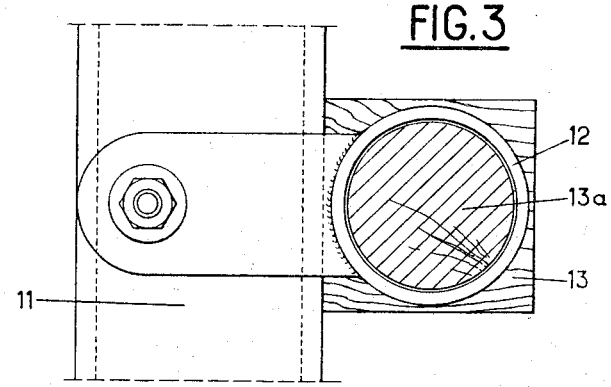
FIG. 3 is a sectional view taken along the line III—III of FIG. 2 looking downward.

Referring to the figures illustrating the first embodiment of the invention, it will be seen that reference numeral 1 designates the outer supporting shell of the tank, for example the hull of the ship. Brackets 2 fixed to this shell support a group of outer elongated members in the form of horizontal ribs 3 mounted thereon by means of bolts 4 passing through oblong holes, so as to permit contraction without abnormal strain.

The ribs 3 are provided with resilient means, for example curved steel strips 3a, and are seated in straps 5 attached by bolts 8 to a plate 6 provided with a tab 7 (FIGS. 1 and 6) and against which the resilient strip 3a presses. The wall, made of the plates 9, having a low coefficient of expansion, preferably the alloy known as "Invar," is welded to the tabs 7. The plates 9 overlap each other along their edges and are welded to each other along these overlapping edges 9a, thus forming a secondary barrier as required by the standards set for such tanks.

At the end of the tabs 7 are mounted a group of intermediate elongated members in the form of vertical girders 11, such girders being secured to said tabs by bolts which pass through oblong holes 7b and said girders may have a U-shaped cross-section.

Figure 4:
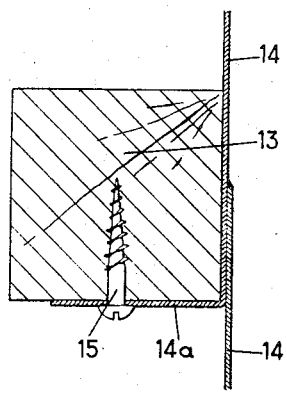
FIG. 4 is a sectional view on an enlarged scale, taken through the portion "B" encircled on FIG. 1.

The vertical girders 11 carry suitably spaced clips 12 and the cylindrical ends 13a of the ribs 13 are slidably engaged therein. These ribs are in the form of inner elongated members which may be made of wood, and the flanges 14a (FIG. 4) of thin plates 14, made of a material like that of the plates 9, are attached to the lower surfaces thereof. The plates 14 overlap and are welded to each other to form the inner shell of the tank. The flanges 14a of the plates are attached to the ribs 13 by means of screws 15 (FIG. 4).

Of course, a suitable insulation support (not shown) is inserted between the walls of the tank, and this insulation may be made in whole or in part as described in my copending U.S. patent application SN 97,058, filed Mar. 20, 1961.

On FIGURES 7–15, which relate to the seond embodiment of the invention, it will be seen that reference numeral 1 designates the hull of the ship, which carries on brackets 2 the ribs 3 which support the secondary barrier 9.

These ribs carry straps 5 fixed to plates 6, to which the secondary barrier is welded. These plates are provided with tabs 7 to which the I-beams 11 are attached.

Between the ribs 3 and the vertical I-beam 11 are the containers 16 and 17 constituting the insulation support in this second embodiment.

FIG. 8 shows at 16 a container designed to be inserted between the hull 1 of the ship and the wall 9, while FIGURES 9 and 10 show one of the containers 17 positioned between the wall 9 and the inner shell 14.

As seen on these figures the containers or insulation holders in question consist of hollow parallelopipeds, which may be made of plywood, and the six sides of which are connected to each other by conventional carpenter's joints.

At each end the containers 16 carry a tongue 16a, while the frames 17 carry a rib 17a dimensioned to seat in the grooves in the I-beams 11.

The containers 16 and 17 are divided into compartments by partitions 18, which compartments are filled, for example, with expanded perlite 19, an insulating material which substantially increases the resistance of the frames in the direction of the arrows f of FIGS. 7–10.

It should be noted that the thicknesses A and B of the frames 16 and 17 may be quite different, with B, for example from 1/5 to 1/10 as great as A. The compartments may be formed from cellular materials such as those described in French Patent No. 1,124,955.

Holes 16b and 17b may be provided at suitable points in the walls of containers 16 and 17 so that the insulation assembly may be placed and maintained under an atmosphere of inert gas, said holes being of course too small to permit egress of the expanded perlite 19.

It should be noted that the space 20 (FIGS. 7 and 11) between two adjacent containers 17 at the right of I-beams 11 is filled with expanded perlite 19 or any other equivalent material.

These spaces constitute the vertical passageways the purpose of which has already been discussed.

The containers 16 are held in place by seating their flanges 16a behind the ribs 3 (as shown at the lower left of FIG. 7) while the containers 17 are mounted between the I-beams 11 by seating the ribs 17a between the flanges 11a of the I-beams.

Figure 7:
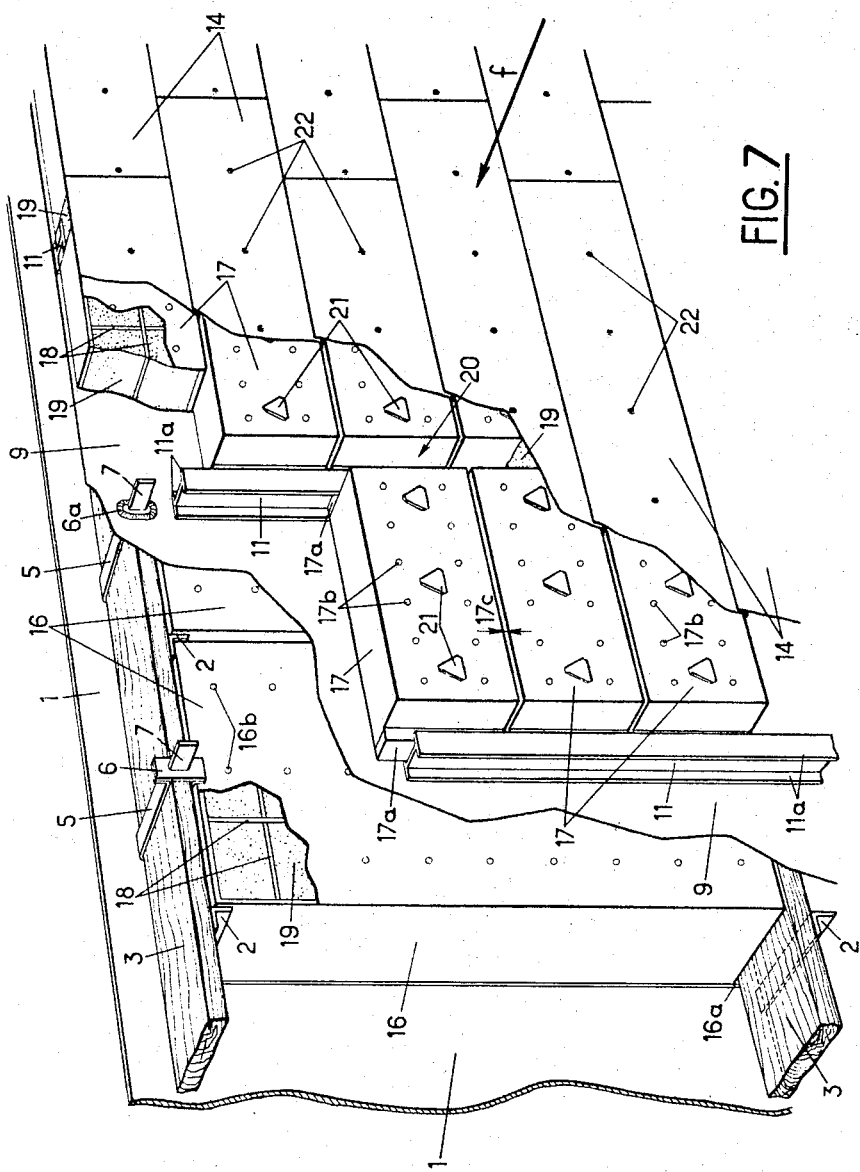
FIG. 7 is a perspective view of part of the tank wall, with sections thereof broken away, illustrating a second embodiment of the invention and showing the arrangement of the containers forming the insulation support.
Figure 11:
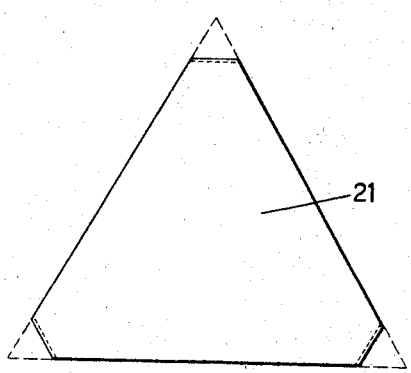
FIGS. 11 and 12 are plan and end views respectively showing the means for mounting the inner shell of the tank on the insulation, in the second embodiment of the invention.
Figure 12:
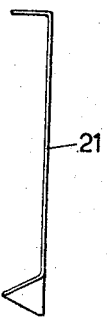

Metallic clips 21 are carried on the inner surface of the containers 17, and the plates forming the shell 14 are attached thereto by spot welds 22, thus forming a quilt-like assembly, as seen on FIG. 7.

Figure 13:
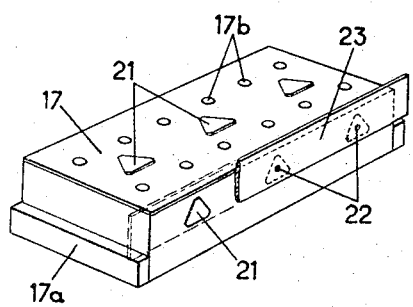
FIGS. 13 and 14 show one way of assembling the sheets which make up the inner shell.
Figure 14:
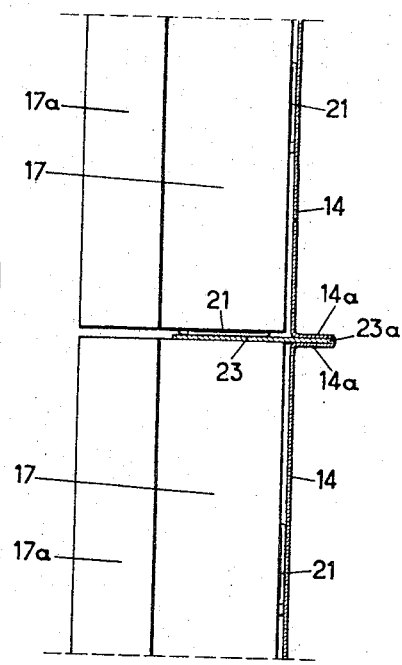

FIGS. 13 and 14 show another method of attaching the plates forming the inner shell to each other.

In this method a tongue 23 which projects inwardly from between the plates 14 is spot welded at 22 to clips 21, the end 23a of the tongue 23 is seated between the flanges 14a on the plates 14.

The tank is assembled in the following manner:

After having stacked up the containers 17, having tongues 23, the plates 14 are brought into contact with these tongues and the two flanges 14a are electrically resistance welded to the end 23a of the tongue. Then the edges of the tongue and flanges are fused together to render the assembly fluid tight. This procedure results in strong, fluid-tight joints, having a good appearance, despite the thinness of the material, which is of the order of .5 mm.

The assembly which has been described makes it possible to economically provide an insulation support which is capable of transmitting forces exerted by the contents of the shell 14 to the hull 1 of the ship. Moreover, in this insulation the members 16 and 17 may contract and expand freely because the intermediate surface constituted by the secondary barrier 9 permits these elements to slide relative to each other.

This arrangement serves the same purpose as the one described in French Patent No. 1,266,486 of Mar. 22, 1960.

In FIG. 15 the shell 14 is double-walled, and made in the manner described in French application No. 933,-980. This shell is supported, in the case of sub-atmospheric pressure within the tank, by flanges 14b attached by means of screws, the role of the ribs 13 described in that application being played by the containers 17 themselves, as in FIG. 1 of the present application.

It has already been pointed out that the secondary wall or barrier 9, which is preferably made of a metal having a low coefficient of expansion, is positioned as close as possible to the wall 14, so that, when in use, there is little difference in temperature between them. The object of this is to avoid too high an over-pressure in the space between said walls 9 and 14 in the event any liquid leaks through the wall 14.

In the absence of this precaution the wall 9 would constitute a hot wall on which the liquid flowing through the leak would suddenly volatilize, with consequent danger that the tank might rupture and endanger the safety of the ship.

In order to reduce the difficulties involved in evacuating gas formed by such sudden vaporization, the vertical passageways 20, while filled with expanded perlite, offer paths of least resistance to the gases, which may thus be withdrawn at the top of the tank.

On the other hand, the vertical passageways 20 are connected to each other by the spaces 17c between the containers 17, provided for this purpose at the bottom of each stack of containers (see FIG. 7).

If water should accidentally penetrate between the shells enclosing the insulation, the expanded perlite inside the compartments of the containers is nevertheless protected therefrom and retains its heat insulating properties.

What is claimed is:

1. A tank for holding gas, said tank comprising an outer wall which is the hull of a ship, an inner wall, and an intermediate wall between said inner and outer walls, a framework within and carried by said outer wall, said framework comprising a group of elongated outer members carried by said outer wall, a group of elongated intermediate members carried by said elongated outer members and a group of elongated inner members carried by said intermediate members, said elongated intermediate members being positioned transversely with respect to the inner and outer elongated members and said elongated intermediate and inner members being mounted to permit expansion and contraction of said intermediate and inner members relative to each other and said outer members, said inner wall being fastened to said inner elongated members, and said intermediate wall being mounted on said framework to permit expansion and contraction of said intermediate wall relative to said inner and outer walls, and insulation filled containers positioned between said inner and intermediate walls and between said intermediate and outer walls.

2. A tank as claimed in claim 1 in which said outer elongated members carry mounting means for supporting said intermediate elongated members which project through said third wall through a fluid-tight sealing joint.

3. A tank as claimed in claim 2 comprising resilient means positioned between said outer elongated members and said intermediate elongated members which permit said intermediate elongated members and inner elongated members to flex as said insulation expands and contracts.

4. A tank as claimed in claim 1 in which said inner elongated members are slidably supported in brackets fixed to said intermediate elongated members.

5. A tank as claimed in claim 1 in which the inner wall comprises plates which carry flanges fixed to said inner elongated members.

6. A tank as claimed in claim 1 according to which the insulation containers are spaced in stacks about the circumference of the tank, leaving vertical passageways between the stacks and said passageways are filled with expanded perlite.

7. A tank for holding gas, said tank comprising an outer wall which is the hull of a ship, an inner wall, and an intermediate wall between said inner and outer walls, a framework within and carried by said outer wall, said framework comprising a group of elongated outer members carried by said outer wall, a group of elongated inner members mounted on said outer elongated members to permit relative expansion and contraction therebetween, said inner members being positioned transversely with respect to said outer members, an outer group of insulation filled containers positioned between said outer and intermediate walls and an inner group of insulation containers positioned and secured against inward movement between said intermediate and inner walls and supported between said elongated inner members, said inner walls being fastened to said inner group of insulation containers, and said intermediate wall being mounted on said framework to permit expansion and contraction of said intermediate wall relative to said inner and outer walls.

References Cited

UNITED STATES PATENTS

| 1,957,822 | 5/1934 | Denning | 52—406 |
| 2,131,620 | 9/1938 | Garrison et al. | 52—404 |
| 2,206,680 | 7/1940 | Sitton | 220—10 |
| 2,582,144 | 1/1952 | Miles | 52—404 |
| 2,684,171 | 7/1954 | Ernst | 220—15 |
| 2,959,318 | 11/1960 | Clark et al. | 220—15 |
| 3,039,418 | 6/1962 | Versluis. | |
| 3,071,094 | 1/1963 | Leroux | 220—15 X |
| 3,072,088 | 1/1963 | Stroschein | 220—15 X |
| 3,122,259 | 2/1964 | Meesen | 220—15 |

FOREIGN PATENTS

| 387,450 | 2/1933 | Great Britain. |
| 928,539 | 6/1963 | Great Britain. |

THERON E. CONDON, *Primary Examiner.*

JAMES R. GARRETT, *Examiner.*